No. 772,026. PATENTED OCT. 11, 1904.
G. F. BUTTERFIELD.
RUBBER SOLED SHOE AND WELT THEREFOR.
APPLICATION FILED FEB. 27, 1899.
NO MODEL.

WITNESSES.
Matthew M. Blunt
H. W. Ladd

INVENTOR.
George F. Butterfield
by A. S. Keener
ATT'Y.

No. 772,026.  
Patented October 11, 1904.

UNITED STATES PATENT OFFICE.

GEORGE F. BUTTERFIELD, OF FRAMINGHAM, MASSACHUSETTS, ASSIGNOR TO GRACE I. BUTTERFIELD, OF BOSTON, MASSACHUSETTS.

RUBBER-SOLED SHOE AND WELT THEREFOR.

SPECIFICATION forming part of Letters Patent No. 772,026, dated October 11, 1904.

Application filed February 27, 1899. Serial No. 706,907. (No model.)

*To all whom it may concern:*

Be it known that I, GEORGE F. BUTTERFIELD, of Framingham, in the county of Middlesex and State of Massachusetts, have invented certain new and useful Improvements in Rubber-Soled Shoes and Welts Therefor, of which the following is a specification.

This invention relates to rubber-soled leather boots and shoes; and my present improvement consists in a new means for securing rubber soles to such boots and shoes, said means comprising as a novel feature a composite flexible welt, the application of such welt to the shoe-bottom, and the vulcanization of the rubber sole to both. The shoe so constructed embodies my invention.

The peculiarity of my composite welt is that there is secured to the under side only of the ordinary welt a flexible strip or layer to which the rubber sole will adhere tenaciously when vulcanized thereon, such strip or layer being a textile tape or band saturated or impregnated with raw-rubber compound, which in vulcanizing will unite with the rubber of the sole, the seams uniting such band to the welt and the welt to the sole being sewed with thread saturated with liquid rubber-cement, which will promote the adhesion of the rubber instead of being waxed, which would repel it. The sewing of seams by rubber-saturated thread is original with me.

The flexible layer may be secured beneath the welt after the welt is affixed to the lasted shoe; but I much prefer to first prepare the composite welt and unite its leather and textile layers by parallel longitudinal seams, after which my improved welt is secured at its inner edge by the channel-seam. The rubber for the outer sole is then applied in the unvulcanized or partially-vulcanized state, and while held in a mold to the shoe-bottom the heat and pressure of vulcanizing cause perfect adhesion of the rubber, especially along the bottom of the welt and around the heel, where a marginal strip may be nailed or stapled. The rubber will adhere also to the leather shoe-bottom if in proper condition therefor.

Figure 1:
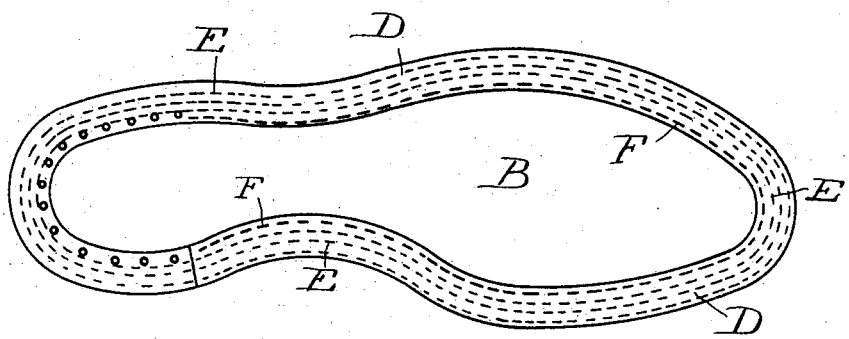
Figure 2:
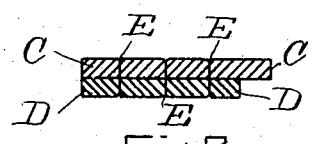
Figure 3:
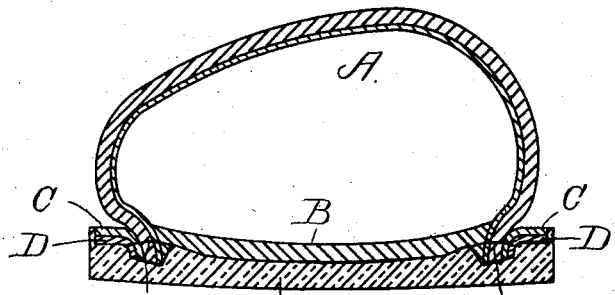

In the drawings, Figure 1 is a plan of a lasted shoe-bottom having my composite welt applied thereto. Fig. 2 is an enlarged cross-section of such welt, the leather portion extending, as it may, at its inner edge beyond the added layer to receive the channel-seam. Fig. 3 represents a cross-section of a shoe embodying my invention.

A is the upper-leather of the shoe, and B the inner sole united, as usual, in lasting.

C is the leather welt-strip, and D the flexible layer secured to the under surface of such strip by longitudinal lines of stitching E.

F is the channel-seam, by which the welt C D is secured to the inner sole and upper, and G is the rubber sole applied to the shoe-bottom while in the raw or uncured condition and vulcanized to the under side of the composite welt and of the sole, the heat and pressure incident thereto causing the rubber to take a very firm hold, especially along the welt and the seam F, which is sewed with rubber-saturated thread to promote adhesion. The lines of stitching E are similarly formed.

The upper layer C of the composite welt is of the usual leather, while the lower layer is of rubber-saturated textile material, to which the rubber G will tenaciously cling, so that along the entire margin of the sole there shall be the most perfect adhesion, there being no danger of separation of the rubber from the shoe-bottom if the union is perfect marginally. A rubber-saturated textile tape or band of friction-coated duck is well adapted for this purpose.

I claim as my invention—

1. The described composite flexible welt for boots and shoes, comprising an upper layer of leather and an under layer only of textile material impregnated with raw rubber such layers united by seams formed by rubber-impregnated threads, substantially as set forth.

2. A boot or shoe having a composite flexible welt secured marginally to its leather sole, such welt comprising an upper layer of leather and an under layer of textile material impregnated with raw rubber, said layers being united to each other and said welt secured to the leather sole by seams formed with rubber-impregnated threads, in combination with an outer sole formed of rubber vulcanized to the under surface of such welt and leather sole, substantially as set forth.

In testimony whereof I have affixed my signature in presence of two witnesses.

GEORGE F. BUTTERFIELD.

Witnesses:
   A. H. SPENCER,
   H. W. LADD.